Figure 1:
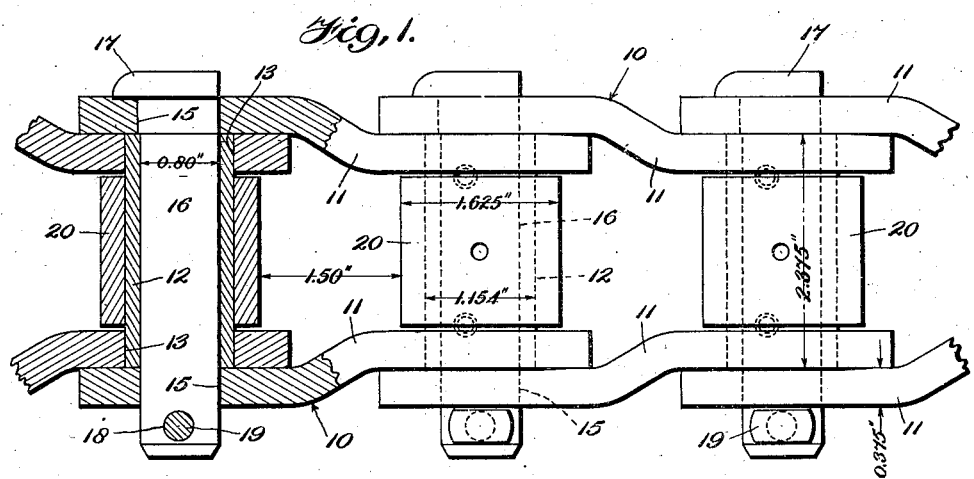
Figure 2:
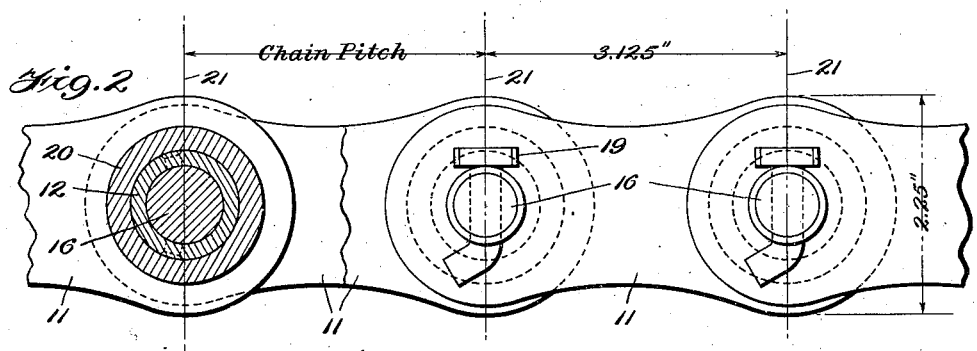
Figure 3:
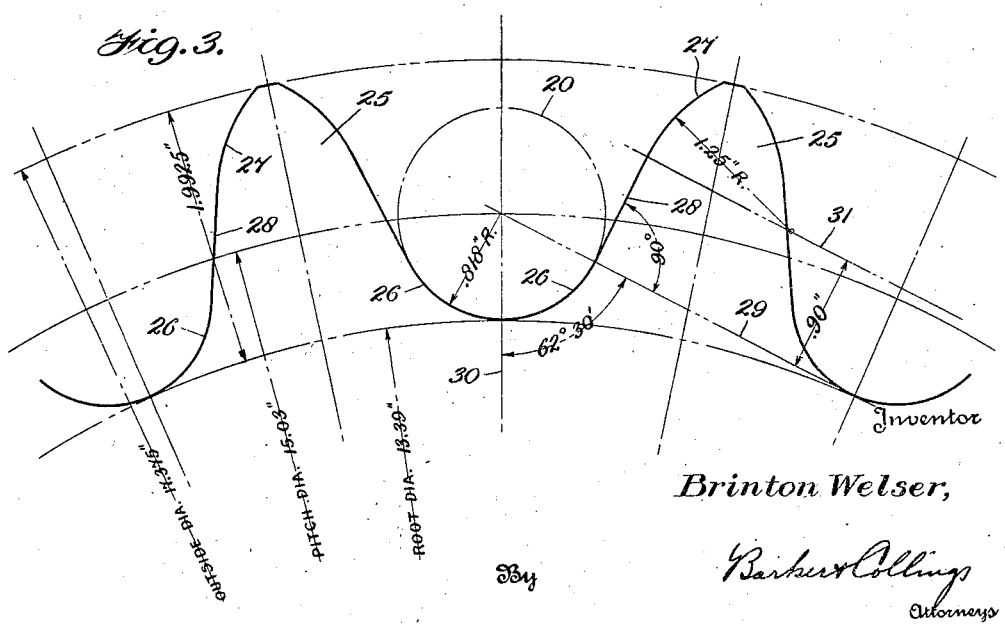

Inventor
Brinton Welser,
By Barker & Collings
Attorneys

June 13, 1939.  B. WELSER  2,162,042
HIGH SPEED CHAIN AND SPROCKET TRANSMISSION
Filed Feb. 19, 1937   2 Sheets-Sheet 2
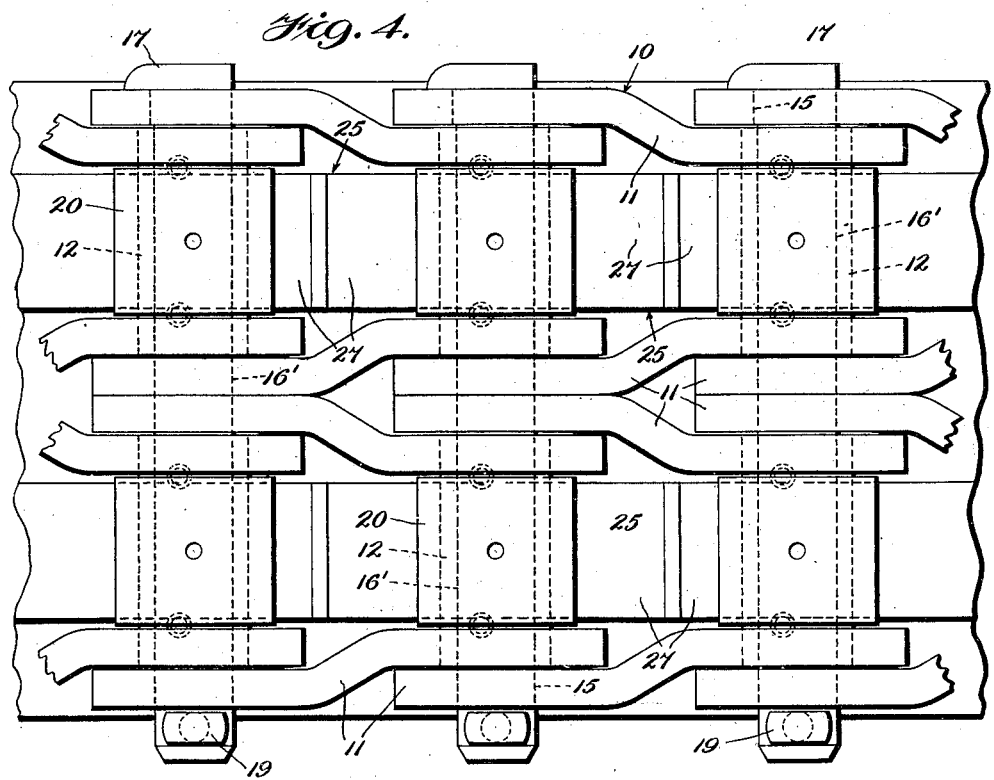
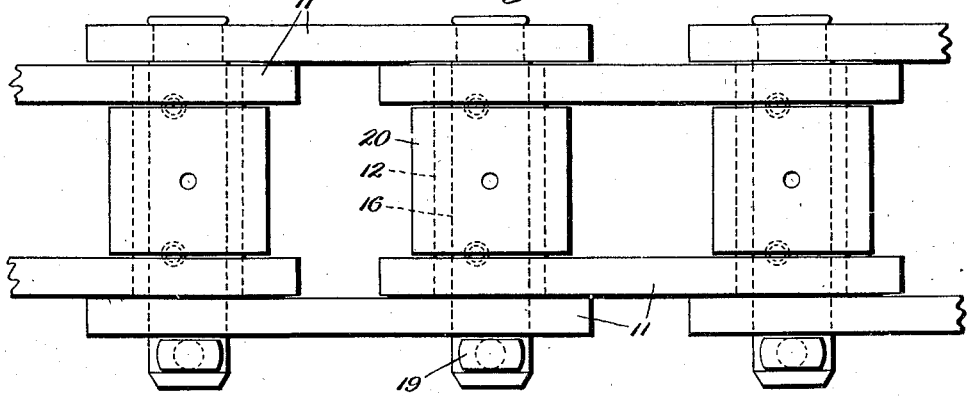
Inventor
Brinton Welser,
By Barker & Collings
Attorneys Patented June 13, 1939

2,162,042

UNITED STATES PATENT OFFICE 2,162,042

HIGH SPEED CHAIN AND SPROCKET TRANSMISSION

Brinton Welser, Milwaukee, Wis., assignor to Chain Belt Company, Milwaukee, Wis., a corporation of Wisconsin Application February 19, 1937, Serial No. 126,698

1 Claim. (Cl. 74—245)

Among the uses for which chain and sprocket transmissions or "chain drives" are very extensively employed, the driving of the draw-works and associated parts of the well-known rotary drilling rigs for oil-wells involves very heavy-duty service under extremely trying conditions, and the depth of wells that can be drilled with over-all economy by these comparatively simple and otherwise desirable rigs is largely dependent upon the characteristics of their chain-drives in the combined respects of high speed-capacity, great strength, slow wear, and capability to operate under poor conditions that tend to cause the chains to jump from their sprockets.

A major object of my invention is to provide an improved chain and sprocket transmission better capacitated in these respects for well-drilling service, and particularly for the drilling of very deep wells, than any hitherto known chain drive of which I am aware.

It will be understood that where, in most fields of use of chain and sprocket transmissions wherein pitch length is in excess of 2 inches, chain speeds do not ordinarily run above 1000 to 1500 ft. per minute and consistent accuracy in the relative positioning of the driving and driven sprockets is expectable, conditions quite normal to the operation of oilwell drives are far more trying. Expectable variations in the set-up of the dismantleable oilwell rings often involve slackness in the chains, mis-alignment of their sprockets and running of chains at steep "leaning" angles or even vertically, all of which—as well as occasional quick reversals of chain travel and expectable shocks of sudden load changes—tend to cause the chains to jump from their sprockets. And additionally, normal desirable speeds of chain travel in these drives are of the order of 3000 ft. per minute and upward, under which conditions chain breakage or jumping is extremely dangerous to the operators and to the equipment, of course.

In these aspects, further objects that I seek and attain are to provide in the chain-structure for normal accommodation of heavy loads under the stated high order of speed and notable resistance to "galling" and quick deterioration of the chain's bearings under snap loads and more protracted overloads, and to provide in the coacting sprockets accommodation for teeth of the proper contour and of adequate height to substantially minimize likelihood of the chain jumping from its sprocket under the expectably poor conditions of operation referred to.

In long-prevailing practice it has been customary to use in these well-rig drives, short-pitch chains of the so-called "3-inch A. P. I. standard" pitch-length in driving the relatively light load of the drill-rotating table, and to employ a so-called "4-inch A. P. I. standard" pitch chain of heavier construction in drives for the hoist drums, speed-changing devices, etc. that carry relatively heavy loads; although at such speeds as are within the slow-wear range of a 3-inch pitch drive, a substituted 4-inch-pitch drive is subjected to such increase of force of impact of its links against the sprockets and wearing effect upon its cross pins and associated bearing parts that the high speed is accompanied by undue wear and quick destruction of the chain.

In these respects another object of my invention is to provide a drive of small-pitch length, approaching that of the customary "3-inch standard" pitch transmissions, having a load carrying strength permitting its operation over customarily-sized sprocket at speeds of 3000 ft. per minute or upward under loads approximating those for which "4-inch standard" pitch drives have hitherto been commonly employed, and with wear-capacity resultant from its construction giving a greater expectable service life under maximal speed and load conditions than either of the hitherto known short-pitch and long-pitch drives just referred to.

As a result of extensive experiments and actual field tests conducted in an effort to meet the unusual and exacting conditions present in these oil rig drives, I have found that the stated objects of my invention may be attained, and with surprising increase in the serviceable life of the drives, where the chain-pitch is substantially 3.125 in., the chain pin diameter is substantially 0.80 in. and the space between the chain rollers is as a minimum substantially 45 per cent. of the pitch-length, while the height or radial length of the well-contoured teeth of any appropriate-diameter sprocket is sufficiently great to accommodate a very substantial amount of slackness of chain without permitting it to jump from the sprockets, such height being desirably about 60 per cent. of the pitch-length. I have found that such drives operate with surprising length of life at speeds of 3000 ft. per minute and upward, which require the R. P. M. of the sprocket (particularly the smaller one in reducing drives) to be of much higher order than is common in most fields of use of chain drives, wherein maximum R. P. M. of sprockets is limited to a quantity equaling 900 divided by the square root of the cube of the pitch in inches,— a formula gener-

struction, in which alternate links are more subject to virtual elongation under wear than are the intervening ones.

While one form of my invention has been illustrated and described in precise detail for purposes of clarity of disclosure, it will be understood that variations from the details described may be made within the spirit of my invention and the scope of the appended claim although, in my experience, variations in pintle and roller diameter and in effective pitch-length should be held within limits of 1/32 of an inch plus or minus of the exemplifying figures hereinbefore stated.

I claim:

A chain and sprocket construction for high speed power transmissions, in which the pressure angle is substantially 62.5 degrees, and in which the height of the sprocket teeth bears to the chain pitch substantially the ratio of 0.63 to 1, each working face of a sprocket tooth being defined by a root curve having a radius approximately equal to that of the chain element engaging therewith, and an entering curve having a radius which bears to the chain pitch substantially the ratio of 0.4 to 1, said curves being connected by a plane surface which is substantially perpendicular to the line of pressure.

BRINTON WELSER.